UNITED STATES PATENT OFFICE.

CARLETON ELLIS AND ALFRED A. WELLS, OF MONTCLAIR, NEW JERSEY, ASSIGNORS, BY MESNE ASSIGNMENTS, TO SETH B. HUNT, TRUSTEE, OF MOUNT KISCO, NEW YORK.

PROCESS OF MAKING KETONE BODIES.

1,365,053.     Specification of Letters Patent.     Patented Jan. 11, 1921.

No Drawing.     Application filed March 18, 1918. Serial No. 223,147.

*To all whom it may concern:*

Be it known that we, CARLETON ELLIS and ALFRED A. WELLS, citizens of the United States, and residents of Montclair, in the county of Essex and State of New Jersey, have invented certain new and useful Improvements in Processes of Making Ketone Bodies, of which the following is a specification.

This invention relates to a method of producing ketones and fatty acids or other oxidation products from olefins or other unsaturated bodies of an analogous character present in or derived from petroleum material and the like and relates especially to such products produced by the electrolytic oxidation of olefin material dissolved in sulfuric acid and also relates to the isolation of mixtures of saturated hydrocarbons from crudes containing unsaturated material; all as will be more fully hereinafter described. The raw material suitable for carrying out the present process may be found in large quantities in cracked gasolene or in the still gases or vapors from cracking stills and other operations employed in the petroleum industry. A form of cracked gasolene which is suitable for the present process is so-called Burton oil made by cracking heavy petroleum residues under a pressure of 75 lbs. or so. The lighter fractions boiling up to say 110–120° C. contain perhaps 10 to 20% of unsaturated bodies, a considerable portion of which are olefins adapted for use in the present process. These olefins may be extracted by treatment with sulfuric acid and oxidized to form the products described herein. In like manner other cracked products both light and heavy, depending upon the particular oxidation product desired may be used. Olefins obtained from other sources such as the natural olefins of shale oil or mineral oils of other kinds, also olefins obtained in various operations such as the production of Pintsch gas, Blau gas and the like or regenerated olefins obtained in the sulfation process of making alcohols or other olefin material may be likewise employed. When products of comparatively low molecular weight are desired it is possible to utilize the "still gases" from petroleum which contain the vapors of unsaturated bodies. Gases obtained by cracking petroleum in stills or in tubes may be collected and absorbed in sulfuric acid to give an acid extract suitable for making lower ketones and lower fatty acids. In employing moist still gases it is important to dry these so that the sulfuric acid will not be diluted to a point where it will fail to absorb the gases freely.

The acid preferably employed as indicated from the foregoing is sulfuric acid, but any similarly acting acid may be used; especially one of a dibasic or polybasic character. One difficulty which has heretofore been an obstacle in producing pure or fairly pure derivatives of petroleum has been to secure a proper fraction of the petroleum of the desired purity having the necessary reactive qualities. In a product as complex as gasolene, for example Burton oil distillates, when a reaction produces products which are miscible in the gasolene, great difficulty would arise in their separation by distillation or other methods. In the present case the sulfuric acid compound or product formed which is herein termed acid extract or acid concentrate, separates with the greatest ease from the gasolene material so that simple settling or centrifuging enables the olefin acid extract to be obtained in a state of comparatively high purity almost wholly free from the great bulk of saturated hydrocarbon in which the olefins were initially dissolved or associated. Such a procedure thus enables a pure product, that is to say a product consisting mainly of olefins and sulfuric acid or the products of the reaction of the acid on the olefins to be isolated in condition where it may be further treated for the production of oxygen-containing organic bodies. Likewise saturated hydrocarbons are isolated and may be used in the arts where unsaturated hydrocarbons would be objectionable. It is not the purpose of the present invention to produce as the essential or chief product such alcoholic bodies which may be obtained by hydrolysis of the acid extract, but rather to set forth methods of producing oxidation products higher than the alcohols and which cannot be produced by the simple addition of water to an olefin. The invention, in some of its aspects, at least, includes subject matter taken from our co- pending application Serial No. 214,082, filed January 28, 1918, as well as additional matter.

The production of the acid extract is an operation requiring considerable care in order to utilize the olefin material to good advantage. Some olefins readily polymerize in the presence of strong sulfuric acid producing hydrocarbons, tars, resins and the like, which generally speaking are useless for the present purpose. While ethylene is quite stable in contact with strong sulfuric acid, and in fact apparently forms a compound therewith which is stable even when heated, the higher olefins polymerize or form tars quite quickly with strong sulfuric acid especially when the temperature is somewhat elevated. Accordingly in absorbing ethylene from still gases and the like the sulfuric acid may be heated and it may be strong, as for example 66° B. or 98% acid or even fuming acid. In handling still gases the higher olefins may be dissolved in diluted acid kept cool during the operation, as for example by vigorously agitating a quantity of sulfuric acid of 1.8 specific gravity kept at a temperature between 10 and 20° C. while the acid is churned in contact with the gas, or by bubbling the gas therethrough. Under these conditions very little ethylene is dissolved and the gases leaving the first extractor may be passed into a second extractor where there is present acid of 1.84 sp. gr. or higher and heated to 50 or 100° C. more or less. In this extractor the ethylene is absorbed to a considerable extent at least and the issuing gases largely depleted of their unsaturated material may be burned as fuel or used in other ways. Being largely freed of unsaturated bodies under normal conditions of operation, the saturated bodies may be used in various ways where saturated products are required. The acid extract in the first extractor is collected separately from that in the second extractor so as to be oxidized separately and thus the different oxidation products kept from being mixed; or alternatively the extracts from the two extractors or series of extractors may be mixed and oxidized. The still gases may be treated in other ways as for example by passing through towers containing sulfuric acid operating on the counter-current system. In like manner the liquid gasolene obtained from cracking is agitated with the sulfuric acid, diluted acid of preferably 1.8 specific gravity being run in a slow stream with cooling into a large body of gasolene while agitating violently and allowing to settle, and collecting the extract which forms a fairly well defined layer on the bottom after standing for a brief period. Or the gasolene may be run into the acid in some cases. If desired, the extract may be blown with air or exposed to a vacuum to withdraw any loosely bound or entrained volatile hydrocarbons. At that point by dilution of the extract with water and distilling alcohols may be obtained. The mixtures of alcohols derived from the complex olefin mixture initially present in the certain fractions which can be subsequently treated with sulfuric acid to form a solution of alcohols in sulfuric acid or a compound with the sulfuric acid, which products may be submitted to oxidation. The production of an alcohol in this way and subsequent treatment with sulfuric acid involves, in the initial hydrolysis, the dilution of sulfuric acid to such an extent that its recovery is costly. Consequently the acid used in this way may be regarded as wasted under usual conditions of operation. Thus the involved procedure indicated while a possible one is not ordinarily of commercial import. In any event the process of making alcohols as noted does not form a part of the present invention.

We have found that it is possible to directly oxidize the acid extract produced by the sulfation treatment of the olefins. This sulfated material or acid extract may be treated as a chemical entity and may be subjected to oxidation in various ways to produce ketones, fatty acids, aldehydes and the like. We have found that by exposing the acid extract to electrolytic oxygen, especially the latter in a nascent condition, affords ketones and fatty acids. Since the sulfuric acid solution of the olefin is quite readily conducting it is eminently adapted for the present process, and by first forming the acid extract and then diluting with water or saline solution, or other diluting agent, the conductivity within certain degrees of dilution is usually somewhat increased by the addition of water, and in fact when the electrolytic oxidation calls for the addition of the elements of water to the hydrocarbon, water ought to be added at the start or at intervals during the operation or as a continuous stream while electrolysis progresses. The electrolytic treatment may be carried out in a simple cell having electrodes of platinum, lead, carbon or other suitable materials. The two electrodes may be immersed in the acid solution and a current of say 3 to 5 volts or more and of the requisite amperage sent through the solution. Hydrogen is liberated freely at the cathode while comparatively little oxygen appears at the anode and the progress of oxidation may be to some extent watched or judged by the liberation of oxygen gas. A more complex form of cell is one containing a diaphragm or partition separating the anode from the cathode compartment. For example a bag of asbestos may be placed around the cathode or porous cups or asbestos or other septa may be used. We have found that in operating we may use about 6 volts or thereabouts but the actual voltage would depend upon the number of cells and how connected, whether in series or parallel. The cell is preferably closed having a vent into a condenser in order to collect any material entrained by the gases. It is also desirable to scrub the issuing gases by passing through a scrubbing tower containing water or hydrocarbon or some material that will dissolve and hold any acid, ketone and the like which may be suspended or dissolved in the gases.

In the oxidation of unsaturated hydrocarbons oxygen tends to add at the double bond to produce a ketone so that from propylene, for example, acetone is produced, and from butylene, methyl ethyl ketone may be obtained, and similarly with the higher unsaturated hydrocarbons. Lower ketones are sometimes produced to an extent at least, from the higher hydrocarbons. Further oxidation gives rise to the production of fatty acid and in a general way it may be stated that the oxidation takes place at the double bond resulting in, for example, the production from propylene, of acetic acid and in some cases formic acid or formaldehyde. In the case of butylene if the double bond is in the middle, two molecules of acetic acid may be obtained. If the double bond is in the alpha position the production of propionic acid together with some formic acid or formaldehyde may ensue. In the case of amylene, acetic acid and propionic acid may be obtained if the double bond is in the beta position, while in the alpha position butyric acid may be produced. Thus in the case of ketones and acids derived from unsaturated hydrocarbons, it is possible to produce mixtures substantially corresponding to the hydrocarbons present in the unsaturated state in the original gasolene or other raw material, although such correspondence is not exactly true due to the certain side reactions and other changes, including the tendency sometimes observed of shifting of the atoms in the molecular structure in an unexpected manner. However, as a general rule, the ketones, in the first stages of oxidation at least, may be assumed to have the same number of carbon atoms as are present in the unsaturated bodies from whence derived. In the case of the acids, as a general rule the mixture of acids produced have a lower number of carbon atoms than the unsaturated bodies from which they have been produced; and the present invention in one phase thereof, contemplates the production of a mixture of ketones in part at least, having carbon atoms substantially like in number with those of the mixture of unsaturated hydrocarbons from which the ketones have been obtained, while in the case of acids the invention contemplates the production of a mixture of fatty acids having a lesser number of carbon atoms than the unsaturated hydrocarbons from which they have been obtained.

As an illustration of the operation the following may be cited.

Ketones and fatty acids can be readily produced from the diluted acid extract by passing a direct current having low voltage and high amperage through a cell having electrodes which are insoluble in the acid solution, the positive pole being preferably of lead, when oxidizing by means of an electric current. While it is preferable to work in fairly concentrated solutions of acid extract, we have found that the dilution may be within fairly wide limits. In one case an electrolytic cell was made of an acid resistant material having a carbon cathode and a lead anode, the two electrodes being separated by an asbestos diaphragm thus separating the hydrogen from the oxygen. In a cell of this type the oxygen is well utilized in the oxidation of the acid extract, while the hydrogen may be collected in a high state of purity. 600 parts of acid extract which corresponded to 300 parts of gasolene olefins was diluted with twice its volume of water which gave a clear solution with no oily material separating. This was placed in the above-named cell and a direct current of 4 volts and 10 amperes was passed through for several hours. The material was then removed from the cell and distilled and the distillate further purified to separate ketones, fatty acids, etc. It was found by this process that substantial yields of fatty acids and ketones were obtained. The relative proportions of each depend upon the time of reaction, it being possible to further oxidize the ketones to fatty acids. It will be readily understood that the products obtained by this treatment will vary with the composition of the olefin raw material. For example from still gases and vapors ketones having a low boiling point and which are good solvents for cellulose acetate will be obtained, while from olefins having a higher molecular weight the higher ketones will be procured. It should be noted however that on further oxidation the unsaturated material splits at the double bond thus producing the lower fatty acids for example formic and acetic together with those higher in the series such as butyric and valerianic acids.

While in the foregoing illustrations we have mainly confined ourselves to olefins of a liquid character it should be distinctly understood that any olefin ranging from ethylene or propylene up through the series may be used, including various straight chain and branching chain olefins, cyclic hydrocarbons of the paraffin series and all the other unsaturated bodies produced in cracking petroleum which react with sulfuric acid or other separating agent and oxidation vehicle to enable the present process to be carried out.

In the electrolysis of material of this character care should be taken in many cases not to have the voltage too high. For example acetic acid under some conditions is quite readily oxidized when using a voltage of much more than 2 volts and if high voltages are employed it may be necessary to remove the volatile products from the electrolytic cell in a continuous manner as by placing the cell under a vacuum and withdrawing the acetic acid and ketones as fast as formed, thus removing them from the source of oxidation. Water may be added to the cell continuously during this operation so that the particular stage of dilution required may be maintained. When the character of the material being treated warrants its temperature may be raised to the distilling point of the fatty acids and ketones or steam may be blown through the cell to remove these bodies substantially as fast as formed.

What we claim is:—

1. The process of producing ketones which comprises treating cracked gasolene containing unsaturated hydrocarbons with sulfuric acid of 1.8 sp. gr. under sulfating conditions to produce an acid extract, in separating the extract by gravity from the residual gasolene and in electrolytically oxidizing said extract whereby ketones are obtained.

2. The process of producing ketones which comprises treating cracked gasolene with sulfuric acid under sulfating conditions to produce an acid extract, in separating the extract from the residual gasolene and in electrolytically oxidizing said extract, whereby ketones are obtained.

3. The process of producing ketones which comprises treating olefins with sulfuric acid under sulfating conditions to produce an acid extract and in electrolytically oxidizing said extract whereby ketones are obtained.

4. The process of producing ketones which comprises treating unsaturated hydrocarbons with sulfuric acid under sulfating conditions to produce an acid extract and in exposing the product obtained to anodic oxygen.

5. The process of making fatty acids which comprises treating hydrocarbon material containing olefins (including such raw material as gasolene, still gases, shale oil, and the like) with sulfuric acid under sulfating conditions to form an acid extract, in separating the extract from any material not soluble therein, and in subjecting said extract to the action of nascent electrolytic oxygen until fatty acids are obtained.

6. The process of making fatty acids which comprises treating unsaturated hydrocarbon material with sulfuric acid under sulfating conditions to form an acid extract and in subjecting said extract to the action of nascent electrolytic oxygen until fatty acids are obtained.

7. The process of making fatty acids which comprises treating gasolene material containing olefins with sulfuric acid under sulfating conditions to form an acid extract in separating the extract from saturated hydrocarbons and in subjecting said extract to the action of nascent electrolytic oxygen until fatty acids are obtained.

8. In the process of making oxidation products of petroleum hydrocarbons, the step which comprises electrolytically oxidizing acid extract obtained by treating hydrocarbon material, containing unsaturated bodies, with sulfuric acid under sulfating conditions.

9. In the process of making oxidation products of petroleum hydrocarbons, the step which comprises electrolytically oxidizing acid extract obtained by treating highly volatile liquid hydrocarbon material containing unsaturated bodies with sulfuric acid under sulfating conditions.

10. In the process of making oxidation products of petroleum hydrocarbons, the step which comprises electrolytically oxidizing acid extract obtained by treating cracked gasolene material containing unsaturated bodies, with sulfuric acid under sulfating conditions.

11. In the process of making oxidation products of petroleum hydrocarbons, the step which comprises electrolytically oxidizing an acid extract of olefins.

12. In the process of converting unsaturated hydrocarbons of the aliphatic series into oxidation products including ketones and fatty acids, the step which comprises forming a concentrate of the unsaturated compound in an acid vehicle and in electrolytically oxidizing said concentrate whereby reduction and oxidation simultaneously occur.

13. In the process of converting olefins into oxidation products including ketones and fatty acids the step which comprises forming a concentrate of the unsaturated compound in an acid vehicle and in electrolytically oxidizing said concentrate whereby reduction and oxidation simultaneously occur.

14. In the process of converting light volatile liquid unsaturated hydrocarbons of the aliphatic series into acetic acid, the step which comprises forming a concentrate of the unsaturated compound in an acid vehicle and in electrolytically oxidizing said concentrate whereby reduction and oxidation simultaneously occur.

15. The process of converting unsaturated hydrocarbons of the aliphatic series into oxidation products including ketones and fatty acids, which comprises electrolytically oxidizing an acid concentrate thereof having a specific gravity between 1.2 and 1.5 containing unsaturated material united with sulfuric acid.

16. The process of converting light volatile unsaturated hydrocarbons of the aliphatic series into oxidation products including ketones and fatty acids which comprises electrically oxidizing an acid concentrate thereof having a specific gravity between 1.2 and 1.5 containing unsaturated material united with sulfuric acid.

17. The process of making petroleum derivatives containing oxygen, including ketones and fatty acids, which comprises adding slightly diluted sulfuric acid gradually with agitation to cooled gasolene containing unsaturated bodies, the proportion of sulfuric acid by volume being at least equal to the volume of the unsaturated bodies present; in settling and separating the acid extract or concentrate, in withdrawing and freeing the gasolene of sulfuric acid and in oxidizing the acid concentrate by exposure in a diluted condition at a suitable temperature to the action of electrolytic oxygen in a nascent condition; whereby oxygen-containing petroleum derivatives are obtained.

18. The process of making petroleum derivatives containing oxygen, including ketones and fatty acids, which comprise adding slightly diluted sulfuric acid gradually with agitation to cooled gasolene containing between 10 and 20% of unsaturated bodies, in settling and separating the acid extract or concentrate, in withdrawing and freeing the gasolene of sulfuric acid and in oxidizing the acid concentrate by exposure in a diluted condition at a suitable temperature to the action of electrolytic oxygen in a nascent condition; whereby oxygen containing petroleum derivatives are obtained.

19. The process of making petroleum derivatives containing oxygen, including ketones and fatty acids, which comprises adding slightly diluted sulfuric acid gradually with agitation to light volatile gasolene containing unsaturated bodies, the proportion of sulfuric acid by volume being at least equal to the volume of the unsaturated bodies present; in settling and separating the acid extract or concentrate, in withdrawing the gasolene and in oxidizing the acid concentrate by exposure at a suitable temperature to the action of electrolytic oxygen in a nascent condition; whereby oxygen containing petroleum derivatives are obtained.

20. In an oxidation process the step which consists in treating a dilute mixture of olefins dissolved in saturated hydrocarbons with an acid extracting agent to form an acid concentrate capable of giving alcohols on hydrolysis, the extract formed being substantially immiscible in the saturated hydrocarbon, in withdrawing the extract and in subjecting the latter to oxygen in the anode chamber of an electrolytic cell.

21. As a new composition of matter, an acid product comprising a mixture of fatty acids derived from olefins of cracked petroleum by electrolytic oxidation of sulfated acid extract of such olefins.

CARLETON ELLIS.
ALFRED A. WELLS.